CARD READING DEVICE HAVING SELECTIVELY OPERABLE PLATEN

Filed Aug. 1, 1966 7 Sheets-Sheet 1

INVENTORS
Thomas J. Schinner
Ernest B. Zimmer
BY
Wood, Herron and Evans
ATTORNEYS INVENTORS
Thomas J. Schinner
Ernest B. Zimmer
BY
Wood, Herron and Evans
ATTORNEYS

CARD READING DEVICE HAVING SELECTIVELY OPERABLE PLATEN

Filed Aug. 1, 1966

INVENTORS
Thomas J. Schinner
Ernest B. Zimmer
BY
Wood, Herron and Evans
ATTORNEYS

CARD READING DEVICE HAVING SELECTIVELY OPERABLE PLATEN

Filed Aug. 1, 1966 7 Sheets-Sheet 4

INVENTORS
Thomas J. Schinner
Ernest B. Zimmer
BY
Wood, Herron and Evans
ATTORNEYS Aug. 26, 1969 T. J. SCHINNER ET AL 3,463,890

CARD READING DEVICE HAVING SELECTIVELY OPERABLE PLATEN

Filed Aug. 1, 1966 7 Sheets-Sheet 5

INVENTORS
Thomas J. Schinner
Ernest B. Zimmer
BY
Wood, Herron and Evans
ATTORNEYS Aug. 26, 1969 T. J. SCHINNER ET AL 3,463,890

CARD READING DEVICE HAVING SELECTIVELY OPERABLE PLATEN

Filed Aug. 1, 1966 7 Sheets-Sheet 6

INVENTORS
Thomas J. Schinner
Ernest B. Zimmer
BY
Wood, Herron & Evans
ATTORNEYS

INVENTORS
Thomas J. Schinner
Ernest B. Zimmer
BY
Wood, Herron and Evans
ATTORNEYS United States Patent Office 3,463,890
Patented Aug. 26, 1969

3,463,890

CARD READING DEVICE HAVING SELECTIVELY OPERABLE PLATEN

Thomas J. Schinner and Ernest B. Zimmer, Cincinnati, Ohio, assignors to The Cincinnati Time Recorder Company, Cincinnati, Ohio, a corporation of Ohio Filed Aug. 1, 1966, Ser. No. 569,180
Int. Cl. H01h *43/08*
U.S. Cl. 200—46 19 Claims

ABSTRACT OF THE DISCLOSURE

A coded card reader having a movable slide assembly provided with a shelf for supporting a card, an abutment mounted to the slide assembly at the end of the shelf which is engageable with the leading edge of a card inserted into the reader and which is supported by the shelf for reciprocating the slide assembly in a direction parallel to card insertion to a read position in response to insertion movement of the card. Also included is a selectively operable platen movable in a direction substantially normal to the plane of the inserted card supported by said shelf for forcing the card in a direction substantially normal to the reciprocating direction of said slide assembly, thereby facilitating reading of the coded card. Also disclosed are means for disabling one reader when another reader with which it is interconnected is in use.

This invention relates to card readers of the type adapted to sense coded patterns of projections on semi-rigid cards for the purpose of developing electrical control signals for transmittal to apparatus operated by the coded cards.

While the card reader of this invention is susceptible of use in many different environments, a description of its use in conjunction with a gate security system is provided so as to afford suitable framework for understanding and appreciating the various advantages of this invention. In a typical gate security system, each gate is provided with a card reader, which controls operation of that gate. Thus, for example, if the security system is designed for use with a building having six entrances, or gates, a total of six card readers are employed, each located adjacent to and controlling the operation of a single gate. In addition, a recording device such as a remotely controlled printer of the general type disclosed and claimed in Geiringer et al., application Ser. No. 483,730, filed Aug. 30, 1965, for "Remotely Controlled Recorder," is provided at a central monitoring station for producing a permanent printed record of gate activity. This printed record may, for example, include a record of the gates operated, time of operation, and the identification of the person causing such operation.

To enable the gates to be operated and the desired information recorded, each person who is to have access to the building is given a card. The card is divided into two information bearing zones, namely, a gate zone and a user identification zone. These zones when suitably coded, are designed to operate upon insertion of the card into a card reader, the recorder and various ones of the gates. More specifically, the gate zone is divided into a number of gate positions, e.g., six corresponding to the number of different gates susceptible of operation. A card can be coded to open any one gate or any group of gates, or all of the gates. This is controlled by the presence of an embossment at a specified gate position. Each embossment is operative to open only the gate to which the position corresponds upon insertion of the card into the card reader at that gate. Insertion of the specifically embossed card into other readers not designed to be operated by this card is ineffective to open the gates controlled by these other card readers.

The other card zone, that is, the identification zone, is divided into three digit areas. These areas when suitably embossed and sensed by insertion of a card into the proper reader, provide a digital input to the recorder for producing a print-out of the employee's identification number. To facilitate recording, in conjunction with the employee's identification number, the particular gate operated, gate identification signals, unique to each gate, are transmitted to the recorder along with the employee identification number. Thus, each time a card is inserted into a card reader bearing an embossment at the proper gate position, the gate is opened and signals identifying both the employee and the gate are transmitted to the recorder.

In addition, each time a card is inserted into a card reader bearing an embossment at the proper gate position, a print-out of the time of gate operation is obtained. This result is achieved as an incident to the operation of the remotely controlled printer. Specifically, this result is achieved by providing the printer with a time and date print-head which is automatically operable each time a gate is actuated. Thus, in addition to printing the employee's identification number and the gate operated, the printer also provides a print-out of the time of gate operation. A printer constructed in accordance with the inventive principles disclosed and claimed in the above-mentioned Geiringer et al. application is suitable for producing such concurrent time and date print-outs.

A serious problem has arisen in the use of such security systems, particularly where the number of gates is large and their usage frequent. More specifically, it has been found in such multigate systems that, due to chance, two or more employees often simultaneously seek admittance to the plant using different gates. If the card readers at these respective gates are permitted to operate simultaneously, the single recorder serving the entire system fails to properly respond since it is unable to simultaneously record multiple identification numbers. Consequently, no record is obtained of the employees admitted to the plant. In a system where security is of paramount importance, such print-out failures can not be tolerated.

It has been an object of this invention, therefore, to provide a card reader suitable for use in a multigate security system which will not function to actuate a gate if another card reader in the system is already in use. To this end a card reader has been provided, which incorporates novel lockout means responsive to the operation of other readers to thereby prevent the actuation of its gate if another card reader is in use.

Specifically, in a preferred embodiment of the card reader of this invention a slide assembly is provided having a shelf for supporting a card and an abutment fixed to the assembly at the end of the shelf. The abutment is engageable with a card placed on the shelf for reciprocating the slide assembly to a read position when a card is inserted into the reader. On one side of the card a plurality of sensing switches are positioned which are adapted to engage preselected areas of the card for providing inputs to the recorder when the card and switches are urged into sensing relationship. On the other side of the card a shiftable platen is positioned which is independently driven by an actuator in a direction normal to the card for forcing the latter into sensing relationship with the switches in response to reciprocation of the slide assembly to the read position by card insertion.

In addition, the card reader includes means for preventing the platen actuator from operating should another reader be in use. Specifically, this lock-out means includes circuitry which disables the platen actuator when another reader is in use so that when a card is inserted into the reader and strikes the abutment, moving the slide assembly into the "read" position, the platen will be inoperative and not drive the card into sensing relationship with the switches. Thus, the lock-out means of the preferred embodiment prevents two or more cards from being read simultaneously by disabling the platen actuator so that the rearward shifting of the slide assembly in response to card insertion, which ordinarily energizes the platen actuator, is ineffective to achieve platen actuator energization.

In another embodiment of the invention, the lock-out means includes a movable abutment which is capable of assuming either an "enable" or a "disable" position relative to the shelf. In the "disable" position, which occurs when another reader is in use, a card inserted into the reader is ineffective to drive the slide assembly to the read position to cause platen operation. Hence, in this position no sensing occurs. In the "enable" position, which occurs when no readers are in use, the abutment is locked in place relative to the shelf and a card inserted into the reader drives the slide asembly to the read position, causing the platen to operate and urge the card into sensing relationship with the switches. Thus, the lockout means of this embodiment prevents simultaneous reading of two or more cards by preventing the slide assembly from shifting and energizing the otherwise energizable platen actuator.

Another, and equally important objective of the present invention is to provide a reader in which the independent actuating means employed to drive the platen is as small as possible. This not only makes the reader economical to manufacture, but also renders it more reliable in operation and simpler in construction. It has been, therefore, a principal object of this invention to provide a reader which utilizes the smallest possible platen actuator. This objective is achieved by orienting the actuator in such a manner that the force it applies is in a direction parallel to the card and shelf, and then coupling this force in a force multiplication mode to the platen via a bellcrank having a long leg connected to the actuator and its short leg connected to the platen.

The various features, advantages, and details of my invention will be more clearly apparent to those skilled in the art from the following detailed description taken in conjunction with the drawings in which.

Figure 2:
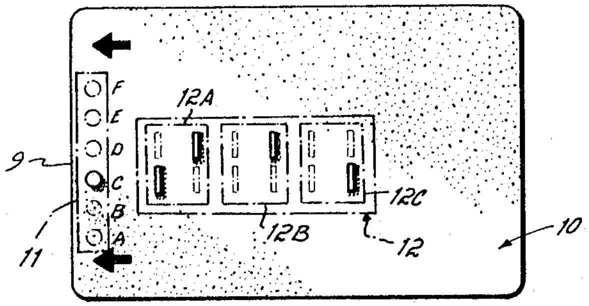
FIGURE 2 is a diagrammatic view of a card depicting the several information bearing areas to be read by the card reader.

Referring to FIGURE 2, a card 10 suitable for use in the present invention is shown. The card 10, which is preferably rectangular in shape and fabricated of semirigid material such as plastic, is provided with two principal information bearing zones 11 and 12. The zones are conveniently classified on the basis of the function performed by the presence of embossments therein. For example, if as in the illustration given previously, the card is used to admit an employee through a gate and print his identification number, one zone, zone 11, is designated the gate zone and the other zone, zone 12, the identification zone.

Gate zone 11 is divided into six gate positions 11A–11F, each of which corresponds to a different door or gate. When a particular gate position corresponding to a specific gate is embossed, and the card being the embossment is inserted into the reader associated with that gate, the gate operating mechanism corresponding to the embossed positions is actuated permitting the card holder to enter. For example, if gate position 11A corresponds to the main gate of a plant, when a card having an embossment in this position is inserted into the card reader controlling the main gate, the embossment is sensed by the reader and the main gate operating mechanism actuated, permitting the employee who inserted the card to pass therethrough. Of course, cards having embossments in code positions other than at 11A, such as in positions 11B–11F will not function to operate the main gate and, hence, an employee having a card with an embossment at such a gate position will not, upon insertion of the card into the card reader associated with the main gate, cause this gate to be operated.

The other principal information bearing zone, zone 12, is divided into three digit areas 12A–12C, each of which contains four digit positions designated 1, 2, 4, and 7. Each of the digit areas 12A–12C, when appropriately coded, is designed to represent one digit of a three-digit employee identification number, the employee identification digit represented being determined by the sum of the numbers associated with the embossed digit positions. For example, when digit positions 2 and 4 of digit area 12A are embossed, an employee identification digit corresponding to the sum of the embossed digit positions 2 and 4 is provided, namely, the employee identification digit 6. In like manner, digit area 12B embossed in digit position 2, represents the employee identification digit 2, and digit area 12C embossed in digit position 7 represents employee identification digit 7. The illustrative coding of the digit area 12A–12C, as depicted in FIGURE 2, combine to represent the employee identification number 627.

In operation, when a card bearing the proper gate embossment is inserted into a card reader, the embossed digit positions of each of the digit areas 12A–12C are sensed and digit signals corresponding to the digits of the employee identification number are transmitted to a remotely located printer to produce a print-out of the employee identification number. Thus, the opening of a gate in response to an insertion of a card into a card reader is accompanied by a remote print-out of the identification number on the employee's card, thereby establishing a permanent record of the identification of the employee whose card has caused the gate to be operated.

Figure 1:
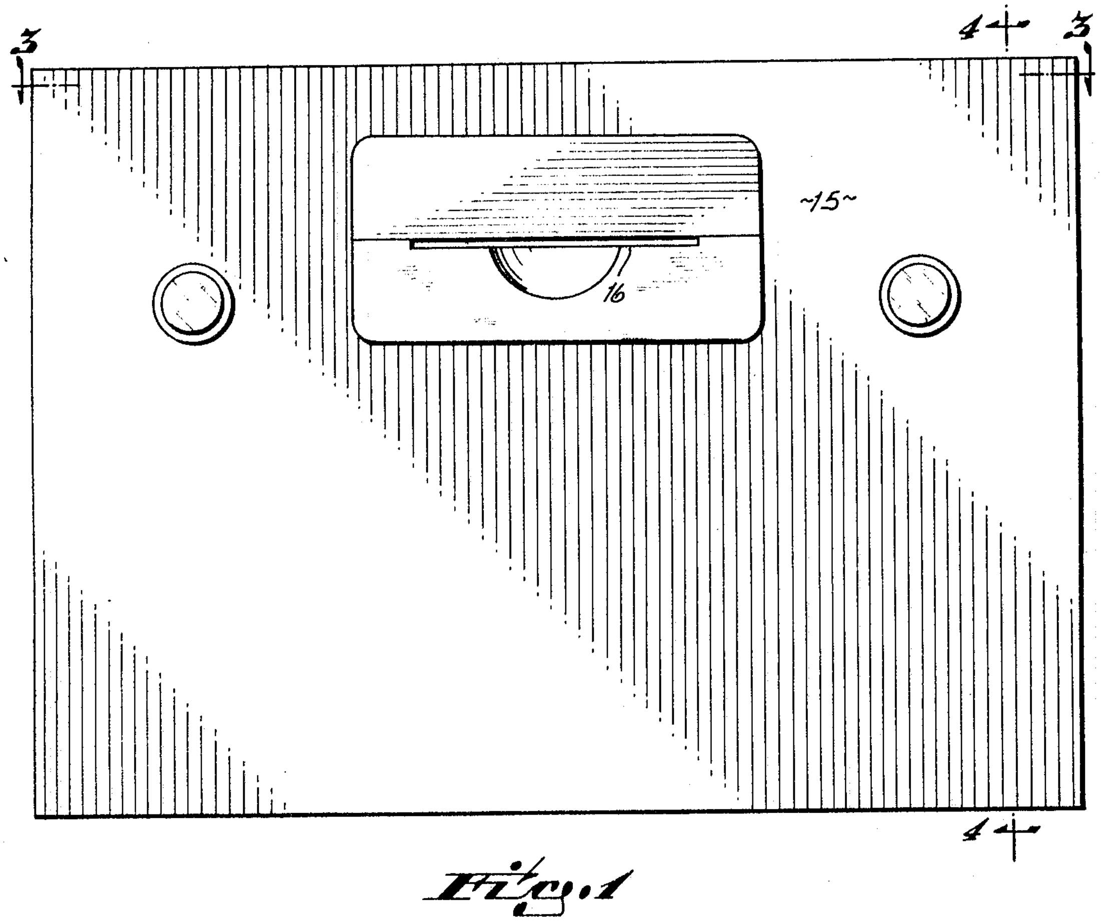
FIGURE 1 is a front elevational view of a card reader console showing the slot into which a card is inserted for reading.

Referring to FIGURE 1, the front panel 15 of a console, which is adapted to house the card reader of this invention, is depicted. The console front panel 15 is provided with a suitable horizontally disposed slot or opening 16 into which a card may be inserted by an individual to facilitate gate actuation and remote printing of the employee's identification number.

As shown in FIGURES 3–6, the preferred embodiment, in which the lock-out function is accomplished electrically, includes a main U-shaped frame member 20 having a central portion 21 secured to the back of the console front 15. Extending rearwardly from opposite ends of the central portion 21 of the main frame 20 are a pair of slide frame portions 22 and 23 having at their outer ends support tabs 24 and 25. Secured to the support tabs 24 and 25 by suitable fasteners 26–27 is a slide frame 28 having a horizontal portion 29 from which depend sides 30(*a*) and 30(*b*). The horizontal frame portion 29 has removed therefrom a substantial portion of material, forming a cut-out 31 bounded on opposite sides by ways 32 and 33 (FIGURES 5 and 6) which slideably support a slide assembly 34 presently to be described.

The slide assembly 34 includes a top member 35, to which are secured by suitable fasteners 36 and 37, depending side members 39 and 40. The side members 39 and 40, at their lower ends, are fixed by suitable fasteners 43 and 44 to opposite edges of a bottom plate 41. The slide assembly 34 is positioned within cut-out 31 formed in the horizontal portion 29 of slide frame 28 and, by means of lateral extensions 45 and 46 formed on top plate 35, is slideably mounted on ways 32 and 33 of the slide frame 28. The extent of sliding movement between the lateral extensions 45 and 46 and the ways 32 and 33, and hence between the slide assembly 34 and the console front panel 15 and the main frame 20, is limited by the interaction of the elongated slots 47A–50A formed in ways 32 and 33 and the fasteners 47–50 which project through the slots and are anchored in the lateral extensions 45–46 of the top plate 35.

Figures 3, 4:
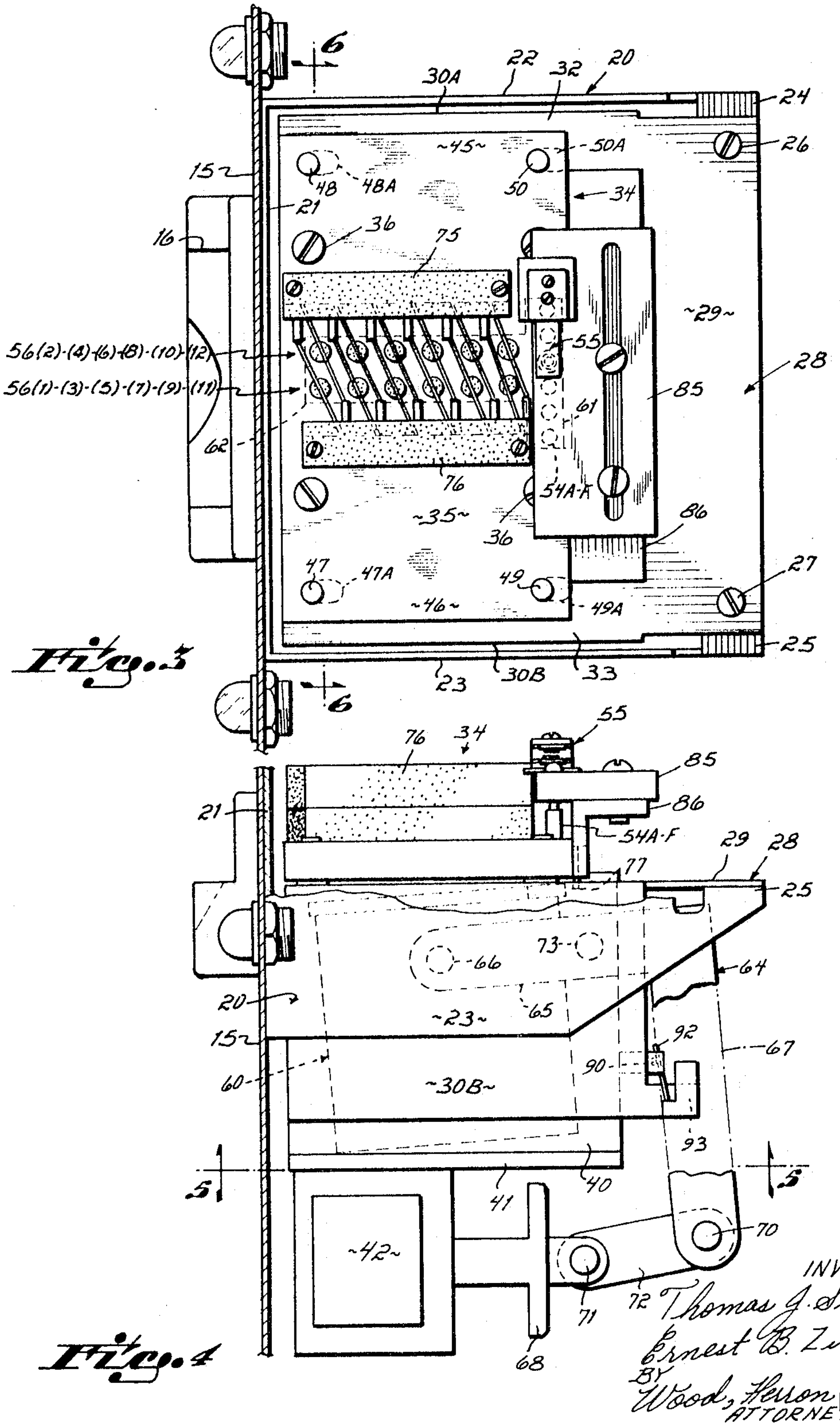
FIGURE 3 is a cross-sectonal view taken along line 3—3 of FIGURE 1, providing a top plan view of a preferred embodiment of the card reader.
FIGURE 4 is a cross-sectional view taken along line 4—4 of FIGURE 1, providing a side elevational view of the preferred embodiment of the card reader.
Figure 5:
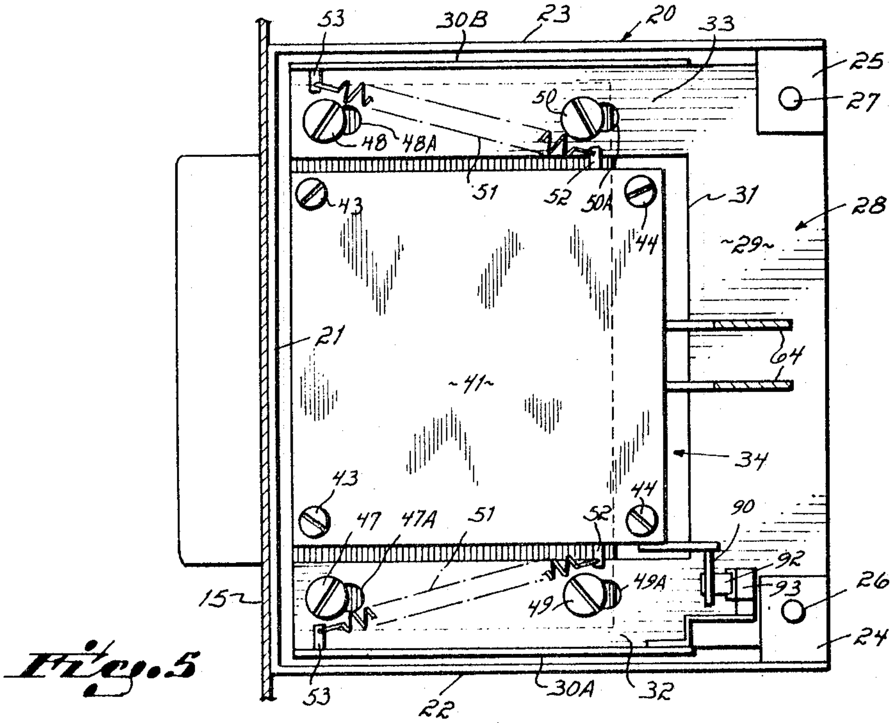
FIGURE 5 is a cross-sectional view taken along line 5—5 of FIGURE 4, providing a bottom plan view of the preferred embodiment of the card reader.
Figure 6:
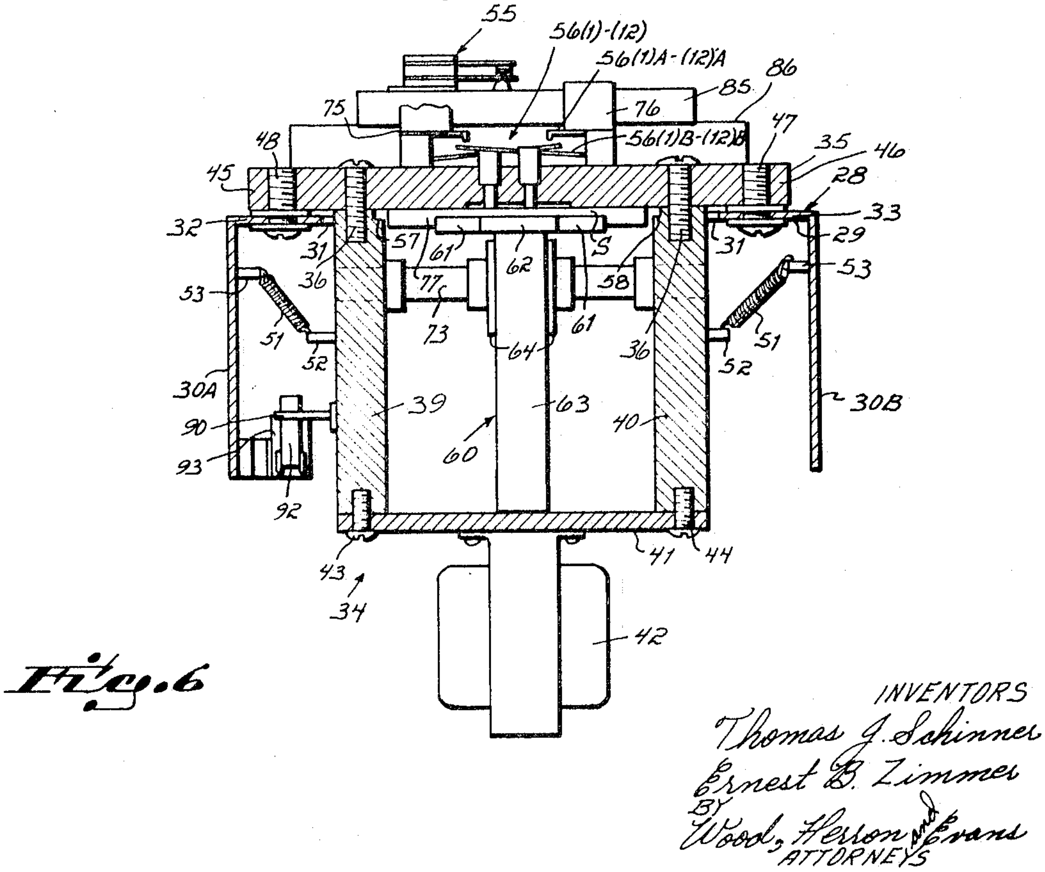
FIGURE 6 is a cross-sectional view taken along line 6—6 of FIGURE 3.
Figure 7:
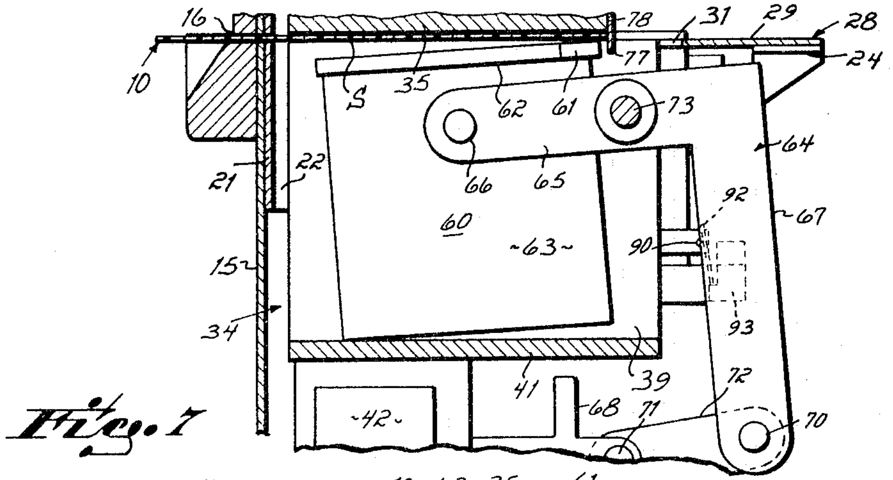
FIGURES 7, 8 and 9 are cross-sectional views, taken along the centerline of the preferred embodiment of the card reader, depicting the relative movement of the slide and platen assembly with respect to the stationary support which occurs during the insertion of a card.
Figure 8:
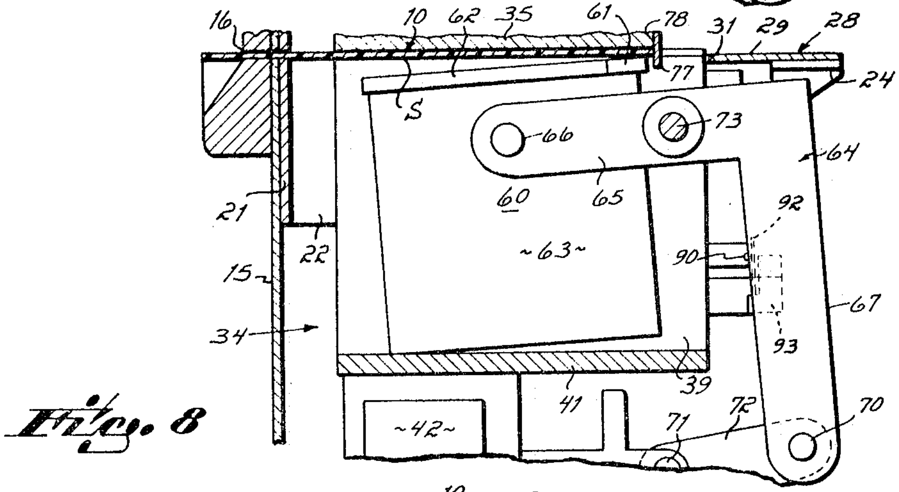
Figure 9:
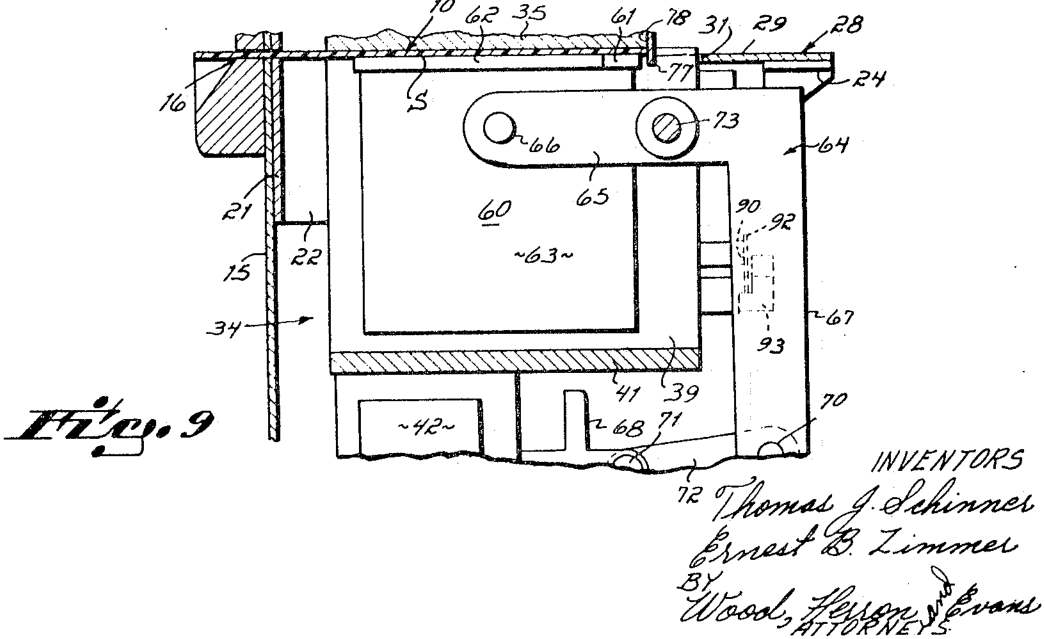
Figure 12:
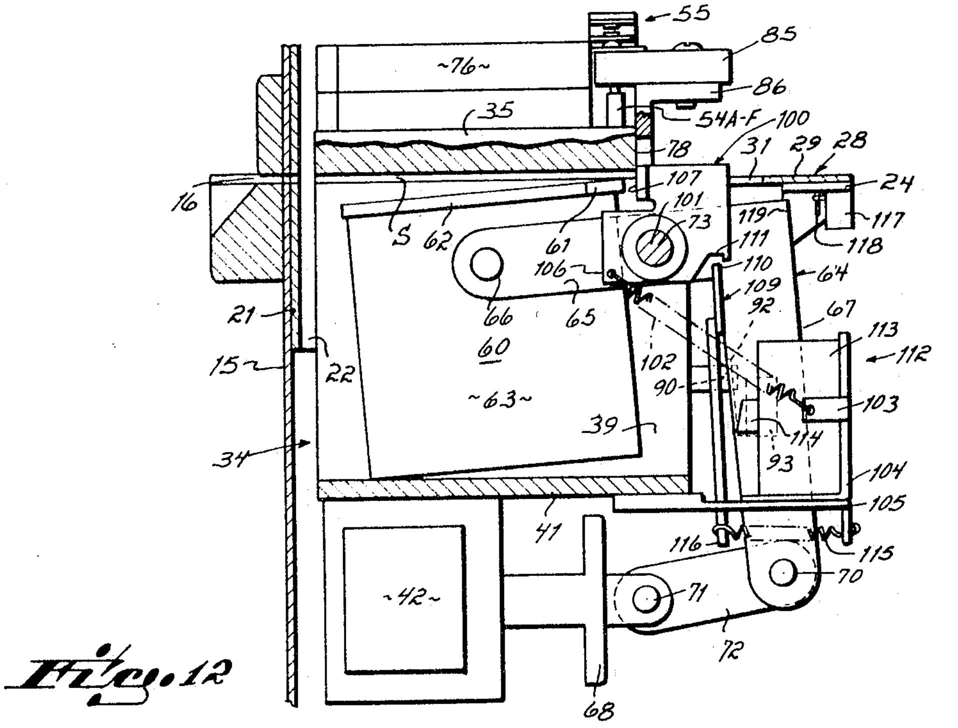
FIGURES 12 and 13 are cross-sectional views similar to FIGURES 7, 8 and 9 depicting another embodiment of the card reader in an enabled or read condition.
Figure 13:
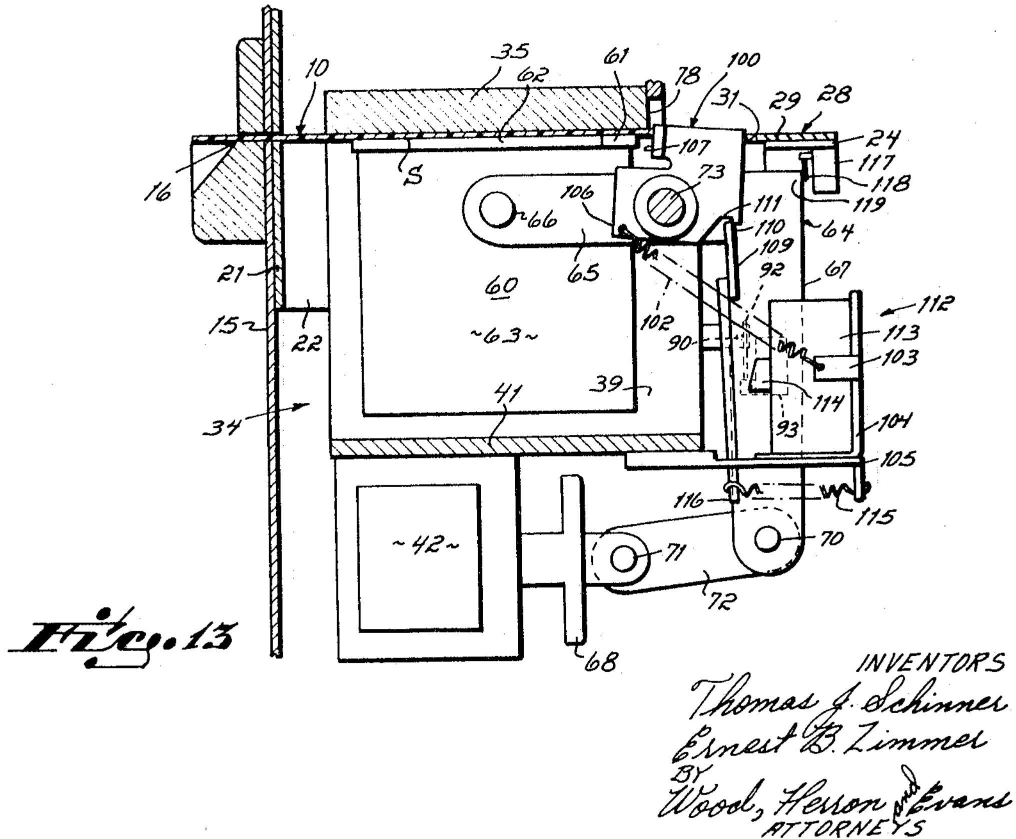

A pair of springs 51 connected, respectively, between a pair of lugs 52 formed on side members 39 and 40 and a pair of lugs 53 formed on sides 30(*a*) and 30(*b*) of the slide frame 28 bias the slide assembly 34 toward the console front 15 to the position shown in FIGURES 3, 4, 5. In a manner to be described hereafter, the slide assembly 34, in response to insertion of a card into the reader, is shiftable rearwardly relative to the slide frame 28 to the extent permitted by the slots 47A–50A.

The top plate 35, upon which are mounted a plurality of identification switches 56 and a gate switch 55 to be described in detail later, in conjunction with a pair of shoulders 57 and 58 formed on the upper and inner edges of the side members 39 and 40, form a slot S for receiving and supporting a card 10 inserted through the aperture 16 into the card reader. An abutment 77 fixed to and depending from the back edge 78 of the top plate 35 limits the rearward movement, relative to the slide assembly 34, of a card inserted through the aperture 16 into the slot S formed by the shoulders 57, 58 and the bottom surface of the top plate 35. The abutment 77 can take many forms and preferably is a strip of rigid material which extends substantially across and below the slot S formed by shoulders 57, 58 and the bottom surface of top plate 35. In operation, the abutment transmits motion from a card seated thereagainst to the slide assembly 34 upon continued insertion of a card through the aperture 16 into slot S.

A substantially T-shaped platen 60 having portions 61 and 62 underlying and aligned, respectively, with the gate switches 55 and identification switches 56, is mounted upon the upper edge of a platen block 63. The platen 60 is vertically shiftable between the side members 39 and 40 and urges a card inserted into the slot S into sensing relationship with the switches 55 and 56.

A bellcrank 64 is mounted for rotation about a rod 73 having its ends anchored on side plates 39 and 40, and imparts reciprocating vertical motion to the platen 60. The bellcrank 64 has a short link 65 connected at its free end to the platen block 63 via a pin 66, and a long leg 67 connected at its free end via pins 70 and 71 and a link 72 to the armature 68 of a solenoid 42 mounted on the bottom plate 41. In operation, energization of the solenoid 42, in a manner to be described, pulls in the armature 68, pivoting the bellcrank 64 counterclockwise. The pivoting of the bellcrank 64 urges the platen block 63 upwardly, which in turn drives the platen 60 against the bottom of a card positioned in the slot S, driving the card upwardly to effect card sensing by the switches 55 and 56.

A switch 93 fixed to the side 30(*a*) of a slide frame 28 is provided, in conjunction with a circuit to be described, to normally energize the solenoid 42 in response to rearward shifting of the slide asembly 34. The switch 93 is actuated when an arm 92 is pivoted clockwise, as viewed in FIGURE 4 about its lower end in response to being urged rearwardly by a pin 90 which is fixed to the slide side member 39 and moves with the slide assembly 34 when a card is inserted into the slot S.

The identification switches 56 include twelve individual switches 56(1)–56(12). When actuated, the switches transmit, through suitable circuitry not shown, digit signals to the recorder to produce a print-out of the employee's identification number. These switches are arranged to overlie the twelve digit positions constituting the identification zone 12 of the card 10 when the card is inserted into the slot S. Each of the identification switches 56(1)–56(12) includes a stationary contact 56(1)A–56(12)A and a moveable spring wire contact 56(1)B–56(12)B. The normally open pairs of contacts 56(1)A–56(12)A and 56(1)B–56(12)B are mounted upon spaced parallel longitudinal supports 75 and 76 formed of insulative material. The supports 75 and 76 are fixed to the upper surface of the top plate 35. In practice, the contacts of each pair are mounted on different ones of the insulative supports, successively numbered like contacts being mounted upon different ones of the insulative supports 75 and 76, as best shown in FIGURE 3.

Figures 10, 11, 14, 15:
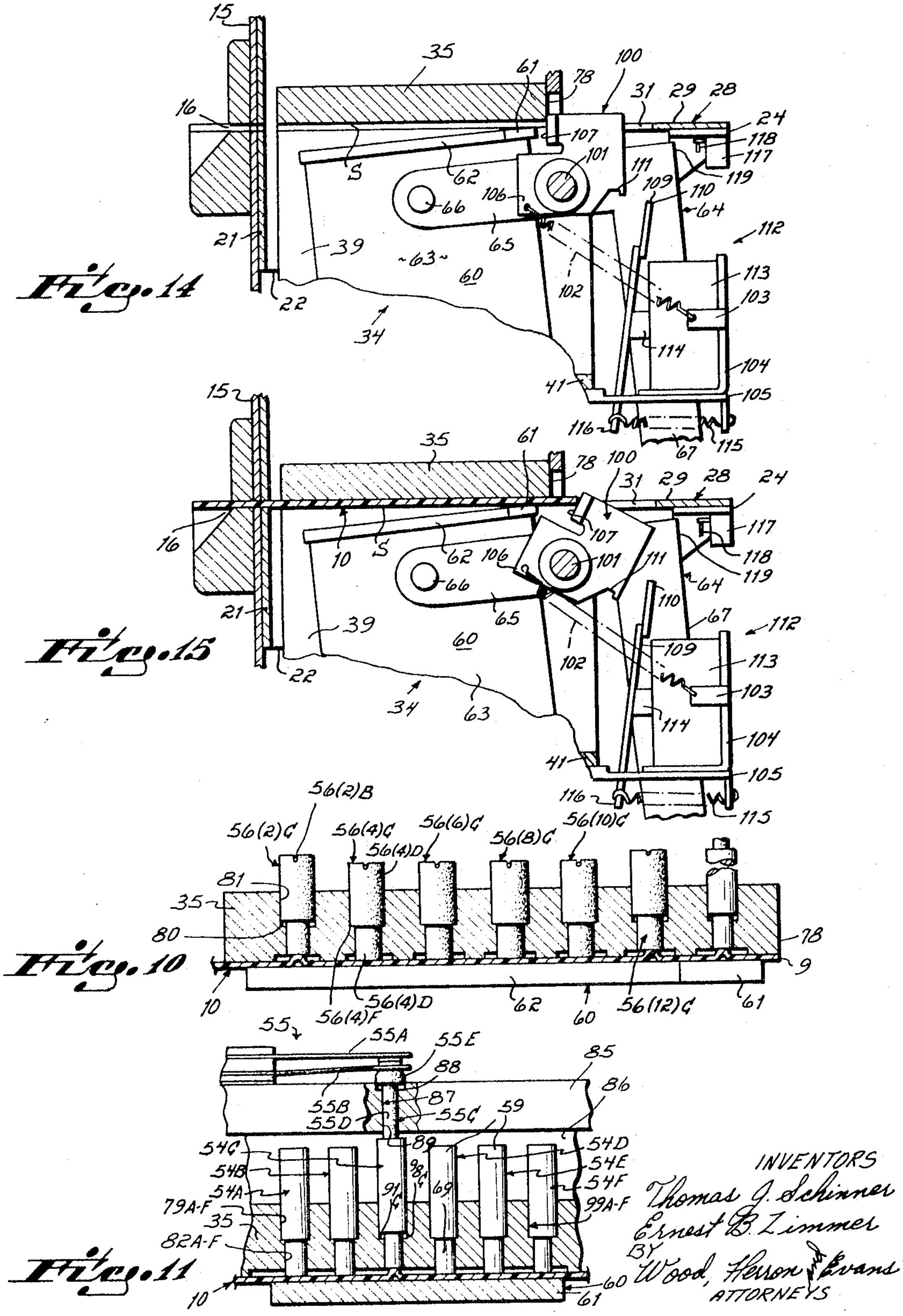
FIGURE 10 is a cross-sectional view taken through the identification switch actuators.
FIGURE 11 is a cross-sectional view taken through the gate switch actuators.
FIGURES 14 and 15 are cross-sectional views similar to FIGURES 12 and 13, but depicting the card reader in the disabled or locked-out condition.

Associated with the identification switches 56(1)–56(12) are combined sensing pins and switch actuators 56(1)C–56(12)C. The combined sensing pins and switch actuators 56(1)C–56(12)C are arranged in two parallel rows to overlie the twelve positions located in the identification bearing zone 12 of the card 10 when the card is inserted in the slot S with its leading edge 9 in contact with the abutment 77. As best shown in FIGURE 10, the combined sensing pins and switch actuators 56(1)C–56(12)C are stepped in diameter, having lower portions 56(1)D–56(12)D and upper portions 56(1)E–56(12)E separated by shoulders 56(1)F–56(12)F. The combined sensing and actuating pins 56(1)C–56(12)C are vertically shiftable between an upper, switch-actuating position and a lower, switch-deactuating position. Specifically, in the upper, switch-actuating position, embossments underlying the bottoms of the small diameter pin portions 56(1)D–56(12)D raise the pins 56(1)C–56(12)C, urging their associated moveable contacts 56(1)B–56(12)B into engagement with their associated fixed contacts 56(1)A–56(12)A, thereby actuating the switches 56(1)–56(12). Illustrative of combined sensing and actuating pins in this upper, switch-actuating position are pins 56(1)C and 56(12)C.

In the lower, switch-deactuating position, which exists in the absence of an embossment underlying the bottom of the small diameter pin portions 56(1)D–56(12)D, the shoulders 56(1)F–56(12)F rest on the cooperating internal shoulders 80 formed in each of the twelve stepped diameter bores 81 which locate the sensing pins 56(1)C–56(12)C. When the pins 56(1)C–56(12)C are so lowered, their associated moveable contacts 56(1)B–56(12)B remain spaced from the fixed contact 56(1)A–56(12)A and the switches 56(1)–56(12) remain in their normally open condition. To insure that the pins 56(1)C–56(12)C assume their lower position in the absence of an embossment underlying their bottom surface, the spring contacts 56(1)B–56(12)B can be designed to exert a downwardly directed biasing force on the upper surface of the pins.

The gate switch 55 is mounted upon the upper surface of a slide block 85 and when actuated opens the gate associated with the particular card reader. The switch position is selectively shiftable relative to an angle bar 86 fixed to the back edge 78 of the top plate 35, thereby permitting a single form of card reader, by merely relocating switch 55, to operate any one of six gates. The switch 55 includes a pair of normally open leaf spring contacts 55A and 55B. The normally open contacts 55A and 55B are selectively closed in response to the upward movement of an actuator 55C comprising a shaft 55D with a cap 55E formed at its upper end. The actuator 55C is positioned within a stepped diameter bore 87 formed in the slide block 85 having a larger diameter portion 88 adapted to receive the cap 55E and a smaller diameter portion 89 into which shiftably fits the shaft 55D. In the raised position depicted in FIGURE 11 the actuator 55C urges the lower contact 55B into contact with the upper contact 55A completing an electrical circuit between the contacts, thereby actuating the switch 55.

Depending upon which one of the embossed gate positions 11A–11F of the card 10 is to cause actuation of the switch 55 to thereby open the gate associated with the card reader, the slide block 85 and, hence, the actuator 55C will occupy one of six positions overlying one of six sensing pins 54A–54F. The sensing pins 54A–54F, which are mounted in bores 99A–99F formed in top plate 35, are positioned to overlie the gate positions 11A–11F when a card 10 is inserted into the slot S with the leading edge 9 of the card 10 in contact with the abutment 77. The pins 54A–54F have an upper, large diameter portion 59A–59F and a lower smaller diameter portion 69A–69F which are positioned, respectively, in upper, large diameter bores 79A–79F and lower, small diameter bores 82A–82F of the bores 99A–99F formed in top plate 35.

All of the sensing pins 54A–54F of FIGURE 11, except that one underlying the actuator 55C, namely, pin 54C, are ineffective to close the switch 55 and operate the gate when raised in response to the presence of an embossed gate position underlying the bottom surface of the small diameter sensing pin portion 69A–69B and 69D–69F. The sensing pin 69C is effective, however, to urge the actuator 55C upwardly to close the switch 55 when an embossment is present in code position 11C of the card 10. With an embossment present in this position, the sensing pin 69C is raised upwardly lifting shoulder 91C off of internal shoulder 98C which separates the larger bore portion 79C from the smaller bore portion 81C. In the absence of an embossment underlying the sensing pin 54C, the shoulder 91C rests on the shoulder 98C, and the cap 55E of the actuator 55C is positioned in the recess 88, disengaged from the contact 55B, permitting the normally open switch 55 to remain deactuated. The presence of embossments underlying one or more of the sensing pins 54A–54B, 54D–54E, while being effective to raise the sensing pin to its upper position, can not actuate the code switch 55 inasmuch as these sensing pins, since they do not underlie the actuator 55C, are unable to transmit switch actuating motion to the switch contact 55B to thereby actuate the switch 55.

In the preceding description of the switches 55 and 56 it is to be understood that the mere presence of an embossment beneath one or more of the switches is not, by itself, sufficient to actuate the switch. It is also necessary that the embossment be urged upwardly, by means of the vertically reciprocating platen 60, against its associated sensing pin. Thus, actuation of the platen as well as the presence of an embossment is needed for switch actuation.

The other embodiment of the invention, employing mechanical lock-out means, is depicted in FIGURES 12–15. Since the structures of both embodiments are in many respects alike, the same reference numerals are used to designate similar elements in both embodiments. Further, since both embodiments share many of the same structural features, the mechanically locked-out embodiment of FIGURES 12–15 presently to be described is described only to the extent that it departs from the structure of the electrically locked-out card reader depicted in FIGURES 3–10.

Specifically, the mechanically locked-out reader has, instead of the fixed abutment 77, a selectively moveable abutment 100 rotatable about a shaft 101 which has its ends anchored in the side frame 39 and 40. The abutment 100 is provided with a spring 102 connected between the lower corner 106 of the abutment 100 and a lug 103 secured to the slide assembly 34 by supports 104 and 105. The spring 102, when the slide assembly 34 is in the position shown in FIGURE 12, biases the abutment 100 in a counterclockwise direction bringing the card abutting surface 107 into contact with the rear edge 78 of the top plate 35.

In addition to the abutment member 100, the mechanically interlocked card reader also employs an abutment disabling mechanism 112 including a detent 109. The detent 109 is mounted near its lower end for pivotal motion between a normal enabled position, in which the upper end 110 is positioned beneath a hook 111 formed on the abutment member 100, and a disabled position, in which the upper end 110 is pivoted clockwise clear of the hook 111 (FIGURE 14). The abutment disabling mechanism 112 further includes an electromagnet 113 having an armature 114, which is secured to the slide assembly by the support members 104 and 105. The electromagnet 113, when suitably energized, pivots the detent 109 clockwise about its lower end overcoming the bias of the spring 115 connected between the lower end 116 of the detent and the lower end of the support 104, causing the upper end 110 of the detent 109 to move from its normal position beneath the hook 111 to the disabled position clear of the hook 111.

The mechanically locked-out card reader includes an additional switch 117 secured to the main frame 20. The switch 117 has an actuating lever 118 which is spaced slightly from the upper corner 119 of the bellcrank 64 when the slide assembly 34 is in the position shown in FIGURE 12. With the actuating arm 118 in this position, the switch 117 is deactuated. The switch 117 is designed to be actuated, disabling the other card readers interconnected with the remotely located printer in response to movement of the slide assembly 34. This actuation is achieved as the slide assembly 34 shifts under the action of card insertion by a tripping interaction between the upper corner 119 of the bellcrank 64 and the actuating arm 118. Specifically, the switch arm 118 is pivoted about its upper end, actuating the switch 117, in response to its lower end being urged to the right, as viewed in FIGURE 12, by the upper end 119 of the bellcrank 64.

The mechanically locked-out reader has two modes of operation, namely, an enabled mode and a disabled mode. In the enabled mode, the electromagnet 113 is de-energized permitting the detent 109 to assume the position shown in FIGURE 12 with its open end beneath the hook 111. In this position, the abutment member 100 in response to insertion of a card into slot S rotates a limited amount about the shaft 101 stopping when the hook 111 engages the upper end 110 of the detent 109. Upon completion of this limited rotation, further movement of the card edge 9 against the card abutting surface 107 shifts the slide assembly 34 rearwardly, tripping the switch 93 as the pin 90 strikes the arm 92. The tripping of switch 93, through suitable circuitry to be described, energizes the platen solenoid 42, urging the platen 60 against the card 10 to thereby effect card sensing.

The reaward motion of the slide assembly 34 in response to card insertion is also effective to trip the switch 117 as the upper corner 119 of the bellcrank 64 actuates switch arm 118. Actuation of the switch 117, through suitable circuitry to be described, effectively disables the other card readers.

In the other mode of operation of the mechanically locked-out card reader, the disable mode, the electromagnet 113 is energized. The energization of the electromagnet 113 draws its associated detent 109 against the armature 114, swinging the end 110 of the detent clear of the hook 111, permitting the abutment member 100 to rotate without limitation. With the abutment member 100 permitted to rotate without limitation, a card inserted into the slot S is ineffective to shift the slide assembly 34 rearwardly. Hence, the switch 93 is not actuated, and the platen solenoid 42 is not energized to thereby urge the platen 60 into sensing relationship with respect to the switches 55 and 56. Thus, in the disabled mode, insertion of a card into the slot S does not produce card reader operation and, consequently, no gate is actuated and a remote print-out does not occur.

Figure 16:
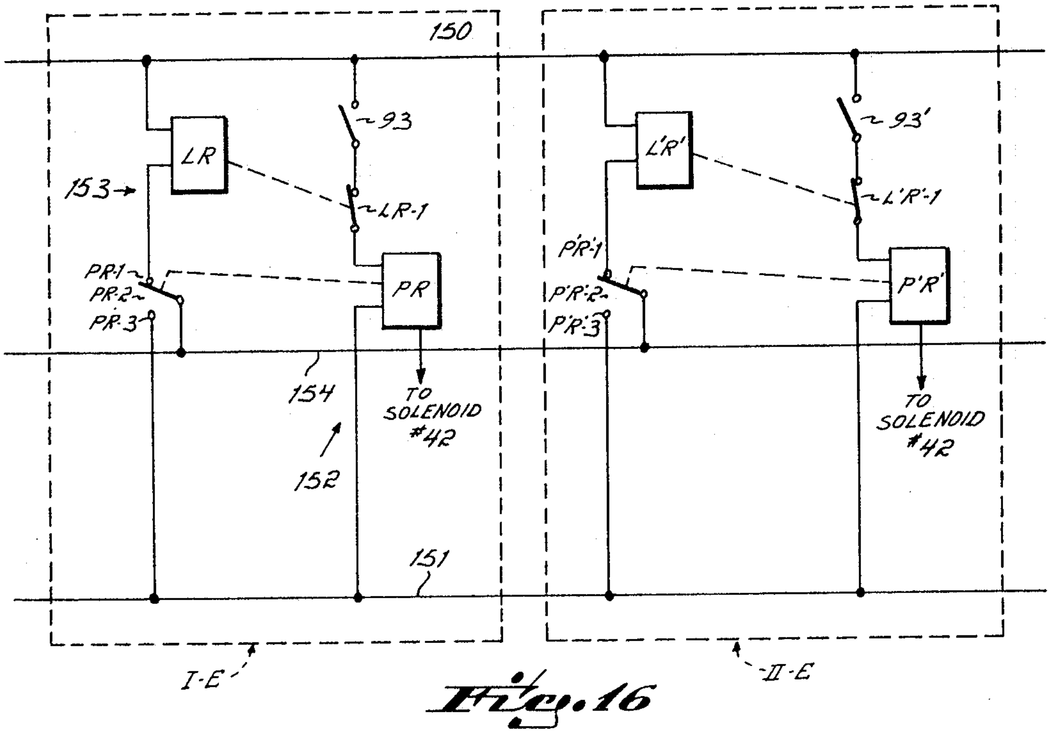
FIGURE 16 is a schematic circuit diagram for the preferred embodiment of the card reader illustrated in FIGURES 1–11.

The manner of interconnecting two or more card readers to provide the electrical lock-out capability for a system comprising a single remotely controlled printer controlled by two or more card readers is shown in FIGURE 16. In this figure, for the purpose of convenience, only two card reader circuits I–E and II–E are illustrated in an interconnected fashion, although it is to be understood that additional circuits could be added by merely connecting them in parallel with the depicted circuits I–E and II–E. Since the circuitry for each of the card readers in a system is identical, the description of the circuit associated with one of the card readers, namely, card reader circuit I–E will be provided.

The circuit I–E includes a pair of positive and negative lines 150 and 151 between which are connected a pair of series circuit paths 152 and 153. Series circuit path 152 includes the normally open switch 93, which is found mounted on the side 30*a* of the slide frame 29 of the electrically locked-out card reader depicted in FIGURE 6, normally closed contacts LR–1, and a platen relay PR. Circuit path 153 includes a lock-out relay LR, which when energized opens normally closed contacts LR–1 to disable the platen relay PR, and relay contacts PR–1, PR–2 and PR–3 which when transferred from the normal position shown in FIGURE 16 in response to energization of the platen relay PR are effective to connect line 154 to negative line 151 thereby energizing the lock-out relay R'L' of card readers circuit II–E, which in turn opens its normally closed contacts L'R'–1 disabling the platen relay P'R' of the card reader II–E.

In operation, assuming no other card readers are in use, lock-out relay LR is de-energized leaving contacts LR–1 in their normally closed position, thereby enabling platen relay PR. When a card is inserted into card reader I–E, switch 93 closes in response to rearward shifting of slide assembly 34, energizing platen relay PR. The energization of platen relay PR, in turn, energizes the platen solenoid 42, raising the platent 60 to effect sensing.

The energization of the platen relay PR, in addition to raising the platen 60, is also effective to transfer contact PR–2. The transfer of this contact connects line 154 to the negative line 151, thereby energizing the lock-out relay L'R' of the card reader II–E, which when energized opens normally closed contacts L'R'–1 in series with platen relay P'R', effectively, disabling the card reader II–E. If now a card is inserted into the electrically locked-out card reader associated with circuit II–E, the closing of switch 93' in response to the rearward shifting of its slide assembly will be ineffective to complete an energization circuit to the platen relay P'R'. With energization of platen relay P'R' prevented, the platen solenoid 42' remains de-energized and the platen which it drives does not rise to produce sensing. Of course, the same result would be produced if, when the card was inserted into the card reader associated with circuit I–E, the lock-out relay LR was energized due to the presence of a card in the reader associated with circuit II–E.

Figure 17:
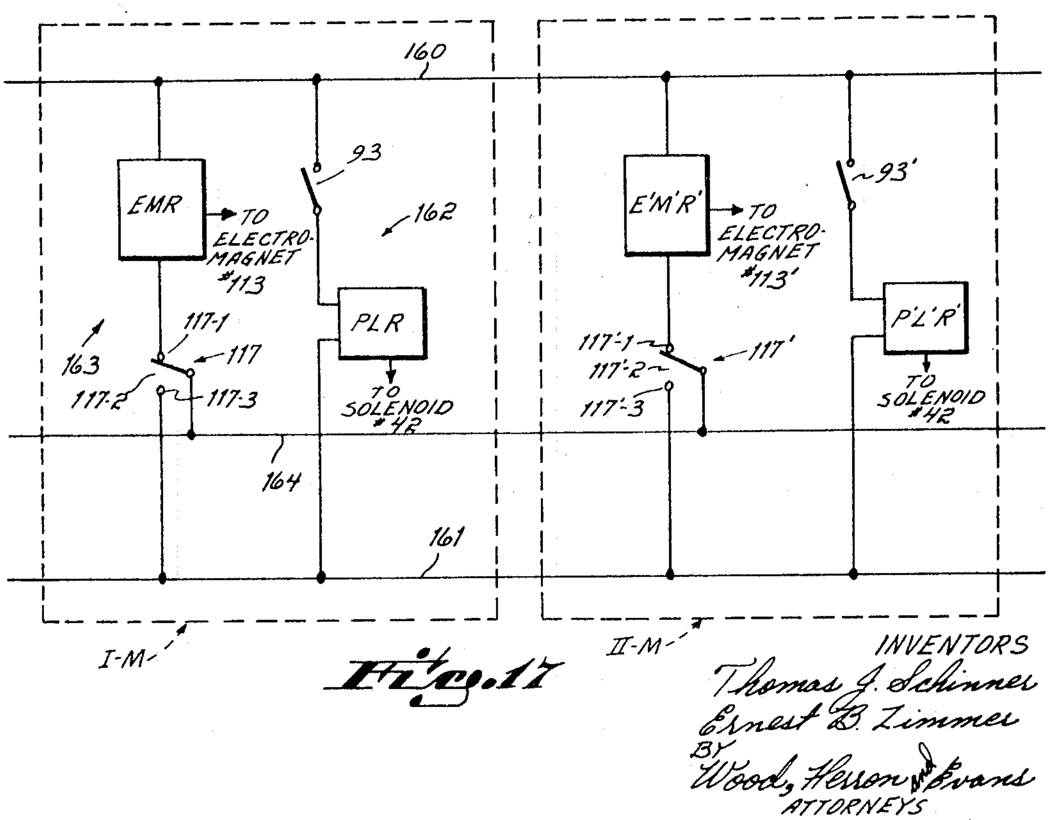
FIGURE 17 is a schematic circuit diagram for the other embodiment of the card reader illustrated in FIGURES 12–15.

The manner of interconnecting the circuits of the mechanically locked-out card readers to provide mechanical lock-out is depicted in FIGURE 17. The circuitry of FIGURE 17, like the circuitry of FIGURE 16, is duplicated for each card reader and, hence, only the circuit I–M of a single card reader will be described. This circuit includes a positive line 160 and a negative line 161 between which are connected two series circuit paths 162 and 163. Circuit path 162 includes a platen relay PLR which actuates the platen solenoid 42, normally open switch 93 which is mounted to the side 30*a* of the slide frame 29 and actuated in response to rearward shifting of the slide assembly 34. The circuit 163 includes an electromagnet relay EMR and switch 117 having contacts 117–1, 117–2 and 117–3. Contact 117–2 is connected to a line 164, and when contact 117–2 transfers, connects line 164 to negative line 161, thereby energizing the electromagnet relay E'M'R' of the other card reader circuit II–M, which is in turn effective to energize electromagnet 113', disabling the card reader associated with circuit II–M.

In operation, when a card is inserted into a card reader, which is not locked-out, the electromagnet 113 is not energized and the slide assembly 34 shifts rearwardly closing the switch 93 and energizing the platen relay PLR, thereby raising the platen 60 to provide sensing. In addition, the rearward shifting of the platen assembly 34 is effective to transfer contact 117–2 of switch 117, connecting line 164 to the negative line 161, thereby completing an energization circuit to electromagnet relay E'M'R' of the other coder circuit II–M. The energization of relay E'M'R' energizes the electromagnet 113' shifting the detent 109' from beneath the hook 111' of its associated reader, thereby disabling it. Should a card now be inserted into the reader associated with circuit II–M, the card will not be effective to shift the slide assembly 34', and switches 93' and 117' are not actuated.

If the reader associated with circuit II–M is in use, the relay EMR will be energized and the card reader associated with circuit I–M disabled. Hence, insertion of a card into the card reader associated with circuit I–M while its relay EMR is energized, will not produce shifting of the slide assembly 34 and tripping of the switch 93 to energize the platen relay PLR and, in turn, the platen solenoid 42. Thus, the card will not be sensed.

Referring to FIGURES 7–9 and 14, and assuming that a card bearing the embossed configuration of the card 10 depicted in FIGURE 2 is inserted into a card reader in which the location of the code switch 55 is positioned as shown in FIGURE 11, operation of the card reader may be effective to actuate its associated gate or door and produce a remote print-out of the employee's identification number, depending on whether or not the reader is enabled or disabled. Specifically, gate actuation and identification number print-out may be effected by insertion of the card 10 into the aperture 16 of the front panel 15, causing the leading edge 9 of the card 10 to strike the abutment 77. As the card 10 is moved further in the direction of card insertion, the abutment 77 is urged rearwardly carrying with it the slide assembly 34. Movement of the slide assembly continues until the slide assembly has reached its approximate limit of travel as defined by the slots 47A–50A. Shortly before this limit of travel is reached, the pin 90 carried by the slide 34 moves the arm 92 of the stationary switch 93 closing the switch 93. If the card reader is disabled, that is, its associated lock-out relay LR is energized opening contacts LR–1, closing of switch 93 is ineffective to energize the platen relay PR and the platen solenoid 42 to produce card sensing and the resultant gate actuation and employee identification number print-out.

However, if the reader is enabled, the closing of the switch 93 energizes the platen relay PR which, in turn, transfers contact PR–2, energizing relay L'R' which opens contacts L'R'–1, disabling the other reader. The energization of the solenoid 42, which is also in response to energization of platen relay PR, draws in its associated armature 68, pivoting bellcrank 64 clockwise about pivot rod 73, raising the platen block 63 and thereby urging the platen 60 against the bottom surface of the card 10 causing the card to be urged upwardly. As the card is urged upwardly, the embossments rise at gate position 11C and identification positions 2 and 4 of location 12A, position 2 of location 12B, and position 7 of location 12C. These embossments raise, respectively, sensing pins 54C which urge actuator 55C upwardly to trip the code switch 55, and sensing pins 56(2)C, 56(3)C, 56(7)C, and 56(12)C, moving flexible contacts 56(2)B, 56(3)B, 56(7)B, and 56(12)B against their associated fixed contacts 56(2)A, 56(3)A, 56(7)A, and 56(12)A, thereby actuating digit switches 56(2) 56(3), 56(7), and 56(12).

If desired, the actuation of the code switch 55 may, through suitably circuitry (not shown), be made to complete a circuit which is in series with each of the digit switches, to thereby control the transmission by the digit switches, upon their closure, of appropriate digit signals to the remotely located printer (not shown) for effecting a print-out of employee's identification number. Failure of switch 55 to be actuated as, for example, by the absence of embossment at location 11C, will, if such circuitry is used, prevent the digit switch circuits (not shown) from being fully completed with the result that closure of the digit switches in response to the embossment underlying their associated sensing pins and actuators will result in only partial completion of the digit switch circuits preventing digit signals from being transmitted to the remotely located printer. Since actuation of the switch 55 ordinarily is also effective to open the door or gate associated with the card reader, it may be desirable, to prevent the gate from being opened prior to the print-out of the employee identification number, to provide suitable circuitry which requires completion of the printing cycle prior to energization of the gate or door opening mechanism. This result could be accomplished by requiring, before gate actuation, the presence of a signal from the printer indicating that the printer has already completed its print cycle.

Thus, for example, utilizing suitable circuitry well within the skill of one in the art, it is possible to make the actuation of the code switch 55 a prerequisite to the transmission of the identification signals to the remote printer, and to make the print-out in response to the receipt of digit signals a prerequisite to the energization of the gate or door actuating mechanism. In this way, the gate or door is never opened until the employee whose card is designed to actuate the gate has had his employee identification number recorded by the remotely located printer.

The mechanically locked-out card reader, like its electrical counterpart, has two modes of operation, namely, an enabled and a disabled mode. In the enabled mode of operation which can exist only when other card readers are not already in use, the electromagnet 113 is deenergized allowing its associated detent 109 to assume the position shown in FIGURE 12 with its open end beneath the hook 111. In this position, the abutment member 100 is capable of only limited rotation about the shaft 101 in response to insertion of the card into slot S. Specifically, the abutment member 100 is capable of pivoting about shaft 101 in a clockwise direction until the hook 111 engages the upper end 110 of the detent 109. Following the completion of this limited rotational movement in response to the intial movement of the card edge 9 against the card abutting surface 107, further movement of the card edge 9 against the card abutting surface 107 is effective to shift the slide assembly 34 rearwardly. The rearward shifting motion of the slide assembly 34, in turn, is effective to trip the switch 93 as the pin 90 carried by the slide assembly 34 strikes the switch actuator arm 92, causing the platen relay PLR and, in turn, the platen solenoid 42 to energize. The energization of the platen solenoid 42 is effective to urge the platen 60 against the card 10 to produce sensing of the card and the resultant actuation of the gate and remotely controlled printer in the manner described previously with respect to the electrically locked-out card reader.

The rearward movement of the slide assembly 34 in response to insertion of a card into an enabled reader, is also effective to transfer the contact 117–2 of switch 117. Specifically, as the slide assembly 34 shifts rearwardly under the action of the card, the upper corner 119 of the bellcrank 64 actuates arm 118 causing the switch contact 117–2 to transfer. Transfer of switch contact 117–2 energizes the relay E'M'R of the other card reader, energizing its electromagnet 113' to thereby disable the other card reader which is also interconnected with the remotely located printer. Specifically, transfer of switch contact 117–2 and energization of the electromagnet 113' associated with the other card reader of the system, pivots the detent 109' clear of its associated hook 111 thereby preventing and disabling the operation of this card reader while the other card reader is in use.

The other mode of operation of the card reader, the disablement mode, exists when one of the other card readers of the system is in use and its counterpart of the switch 117 has been actuated causing all other electromagnets 113', except that of the reader in use, to pull-in in response to becoming energized. The electromagnet 113' of the reader in use, while becoming energized, is prevented from pulling in by the engagement of its detent 110' and associated hook 111'. Specifically, in the disabled mode of operation, the electromagnet 113' is energized drawing its associated detent 109 into contact with the armature 114, swinging detent end 110 clear of the hook 111 (FIGURES 14 and 15). The movement of the end 110 of detent 109 from beneath hook 111 permits the abutment member 100 to pivot without limitation under the action of a card inserted into the slot S. Thus, when the electromagnet 113 has been energized and the card reader disabled, insertion of a card into the slot S is effective only to pivot the abutment member 100 about its shaft 101, the slide assembly 34 not being shifted rearwardly in response to continued insertion motion of the card. Inasmuch as the slide assembly is prevented from shifting rearwardly under the action of card insertion, the switches 93 and 117 are not actuated to energize the platen relay PLR, platen solenoid 42, and the disabling electromagnets 113' of other card readers. Hence, the platen 60 does not rise to strike the card, and consequently the card is not sensed.

Having thus described our invention, what we desire to claim by Letters Patent is:

1. A card reader for reading coded cards, said card reader comprising:

- a movable slide assembly having a shelf element for supporting a coded card inserted into said card reader;
- means mounting said movable slide assembly for reciprocating movement to a read position, said movement being in a direction substantially parallel to said card insertion;
- abutment means connected to said movable slide assembly and engageable with the leading end of said inserted card for reciprocating said movable slide assembly to said read position in response to movement of said leading end of said inserted card against said abutment in a direction substantially parallel to said direction of card insertion direction;
- a plurality of sensing means capable of sensing preselected coded areas of an inserted card when said card has reciprocated said slide assembly to said read position; and a selectively operable platen movable in a direction substantially normal to the plane of said inserted card for forcing said card into sensing relationship with said sensing means when said movable slide assembly is reciprocated to said read position.

2. The card reader of claim 1 further including card reader disablement means for preventing movement of said platen when another card reader interconnected with said utilization device is in use.

3. The card reader of claim 1 further including an electromagnetic actuating member drivingly connected to said platen and responsive to an electrical signal for moving said platen into said sensing relationship with said card.

4. The card reader of claim 3 further including card reader disablement means for preventing actuation of said electromagnetic actuating member when another card reader interconnected with said utilization device is in use.

5. The card reader of claim 4 wherein said electromagnetic actuating member moves parallel to said card support, and further including linkage means interconnecting said electromagnetic actuating member and said platen for multiplying the force applied to said platen by said electromagnetic actuating member.

6. The card reader of claim 5 wherein said linkage includes a bellcrank having a long leg connected to said electromagnetic actuating member and a short leg connected to said platen.

7. An interlocked card reading system comprising:

(1) a plurality of card readers each having (a) a movable slide assembly having a shelf element for supporting a coded card inserted into said card reader;

(b) means mounting said movable slide assembly for reciprocating movement to a read position, said movement being in a direction substantially parallel to said direction of card insertion;

(c) abutment means connected to said movable slide assembly and engageable with the leading end of said inserted card for reciprocating said movable slide assembly to said read position in response to movement of said leading end of said inserted card against said abutment in a direction substantially parallel to said direction of card insertion;

(d) a plurality of sensing means capable of sensing preselected coded areas of an inserted card when said card has reciprocated said slide assembly to said read position; and (e) a selectively operable platen movable in a direction substantially normal to the plane of said inserted card for forcing said card into sensing relationship with said sensing means when said movable slide assembly is reciprocated to said read position, and (2) disablement means responsive to the presence of each of said slide assemblies in their respective read positions for permitting at any given instant only one of said platens to force its associated card into sensing relationship with its associated sensing means.

8. The card reader of claim 2 wherein said abutment, in response to movement of said card, is selectively movable relative to said slide assembly, said abutment when said card reader is enabled being capable of reciprocating said slide assembly to said read position in response to insertion movement of said card in said reader, said abutment when said card reader is disabled being capable of movement relative to said slide assembly in response to insertion movement of said card in said reader thereby preventing said inserted card from reciprocating said slide assembly to said read position.

9. The card reader of claim 8 wherein said abutment is rotatably mounted and wherein said relative movement of said abutment is rotation of said abutment.

10. The card reader of claim 8 further including a detent selectively positionable between a card reader enable position and a card reader disable position in which said detent is engaged with said abutment permitting limited relative motion and is disengaged from said abutment permitting extended relative motion, respectively.

11. The card reader of claim 10 further including electromagnetic means connected to said detent and responsive to a disable signal for positioning said detent in said card reader disable position.

12. The card reader of claim 11 further including a switch means responsive to the presence of said slide assembly at said read station for operating said platen to force said card into sensing relationship with said actuating elements.

13. The system of claim 7 wherein said abutments are fixed relative to said slide assembly, wherein said platens are each controlled by electromagnetic devices connected in parallel circuit arrangement, and wherein said disablement means includes a plurality of switch means each connected in series with a different one of said electromagnetic devices, the operation of said switch means being mutually exclusive enabling only one of said electromagnetic means to be operative at a time.

14. The card reader of claim 1 further including an electromagnetic actuating member for applying a force in a direction parallel to said shelf and card, and linkage means interconnecting said actuating member and said platen for multiplying said force applied to said platen by said actuating member.

15. The card reader of claim 14 wherein said linkage includes a bellcrank having a long leg connected to said electromagnetic actuating member and a short leg connected to said platen.

16. A card reader for reading embossed cards, said card reader comprising:

a plurality of code switches having associated actuating elements engageable with preselected areas of a card located at a read position for providing inputs to a utilization device in response to sensing embossments;

a selectively operable platen moveable in response to an energization signal in a direction substantially normal to said card for forcing said card into sensing relationship with said actuating elements; and switch means adapted to be actuated by the presence of a card at said read station for normally producing an energization signal, said switch means being disabled in response to a disable signal generated when an associated card reader is in use.

17. A card reader for reading coded cards comprising:

a movable slide assembly having a shelf element for supporting a card inserted into said reader and having an abutment fixed to said movable slide assembly at the end of said shelf element, said abutment being engageable with the leading end of an inserted card supported on said shelf element for reciprocating said slide assembly to a read position in response to movement of said leading end of said inserted card against said abutment in a direction parallel to the direction of card insertion; and a selectively operable platen movable in a direction substantially normal to the plane of said inserted card for forcing said card in a direction substantially normal to said parallel direction in which said slide assembly reciprocates to thereby facilitate reading of said inserted coded card by said reader.

18. The card reader of claim 17 further including card reader disablement means for preventing movement of said platen when another card reader interconnected with said utilization device is in use.

19. The card reader of claim 18 wherein said abutment, in response to insertion movement of said card into said reader, is selectively movable relative to said slide assembly, said abutment when said card reader is enabled being capable of reciprocating said slide assembly to said read position in response to insertion movement of said card, said abutment when said card reader is disabled being capable of movement relative to said slide assembly in response to insertion movement of said card, thereby preventing said inserted card from reciprocating said slide assembly to said read position.

References Cited

UNITED STATES PATENTS

| | | | |
|---|---|---|---|
| 3,034,711 | 5/1962 | Cohen | 235—61.11 X |
| 3,042,299 | 7/1962 | Sherman | 235—61.11 X |
| 3,139,519 | 6/1964 | Reinschmidt | 200—46 X |
| 3,308,252 | 3/1967 | Rosen | 200—46 |

ROBERT K. SCHAEFER, Primary Examiner

D. SMITH, Jr., Assistant Examiner

U.S. Cl. X.R.

235—61.11